US006535275B2

(12) United States Patent
McCaffrey et al.

(10) Patent No.: US 6,535,275 B2
(45) Date of Patent: Mar. 18, 2003

(54) HIGH RESOLUTION 3-D IMAGING RANGE FINDER

(75) Inventors: Nathaniel Joseph McCaffrey, Delaware Township, NJ (US); Robert James Andreas, Lawrenceville, NJ (US); Peter Alan Levine, West Windsor, NJ (US); Ramon Ubaldo Martinelli, Hightstown, NJ (US)

(73) Assignee: Dialog Semiconductor GmbH, Kirchheim (DE)

( * ) Notice: Subject to any disclaimer, the term of this patent is extended or adjusted under 35 U.S.C. 154(b) by 0 days.

(21) Appl. No.: 09/772,361

(22) Filed: Jan. 30, 2001

(65) Prior Publication Data

US 2002/0036765 A1 Mar. 28, 2002

Related U.S. Application Data

(60) Provisional application No. 60/224,223, filed on Aug. 9, 2000.

(51) Int. Cl.[7] .......................... G01C 3/08; G01B 11/26

(52) U.S. Cl. .................................. 356/5.08; 356/141.1

(58) Field of Search .............................. 356/5.01–5.08, 356/141.1

(56) References Cited

U.S. PATENT DOCUMENTS

| | | | | | |
|---|---|---|---|---|---|
| 5,760,886 | A | * | 6/1998 | Miyazaki et al. | 356/5.01 |
| 5,870,180 | A | * | 2/1999 | Wangler | 356/401 |
| 5,892,575 | A | * | 4/1999 | Marino | 356/5.01 |
| 6,057,909 | A | * | 5/2000 | Yahav et al. | 356/5.04 |
| 6,137,566 | A | * | 10/2000 | Leonard et al. | 356/141.1 |
| 6,323,942 | B1 | | 11/2001 | Bamji | |

* cited by examiner

*Primary Examiner*—Stephen C. Buczinski
(74) *Attorney, Agent, or Firm*—RatnerPrestia

(57) ABSTRACT

A three-dimensional imaging range finder is disclosed using a transmitted pulse reflected from a target. The range finder includes a pixel sensor for receiving light from the target and the reflected pulse. A global counter is provided for determining a time-of-flight value of the transmitted pulse by providing accurate count data to pixel memories. A processing circuit, which is coupled to the pixel sensor and the global counter, extracts the reflected pulse received by the pixel sensor, and stores the time-of-flight value upon extracting the reflected pulse. The pixel sensor provides a luminance signal and the processing circuit includes a high pass filter to extract the reflected pulse from the luminance signal.

23 Claims, 3 Drawing Sheets

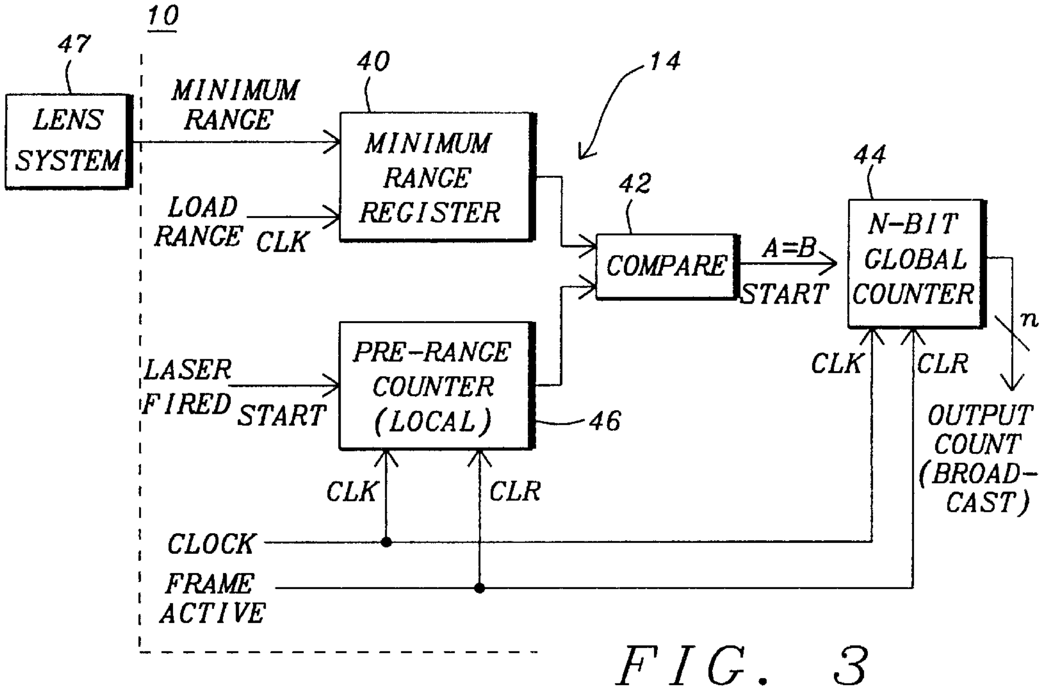
FIG. 3
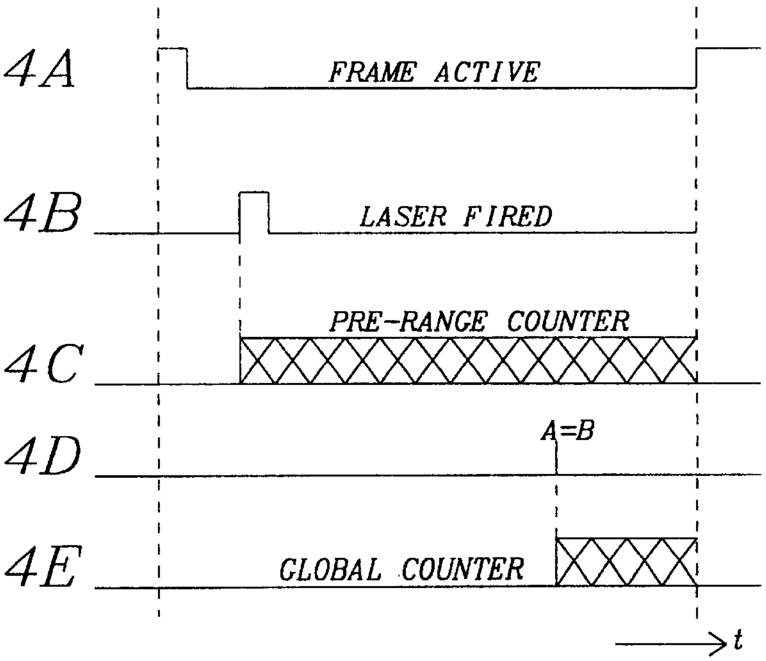
FIG. 4A
FIG. 4B
FIG. 4C
FIG. 4D
FIG. 4E

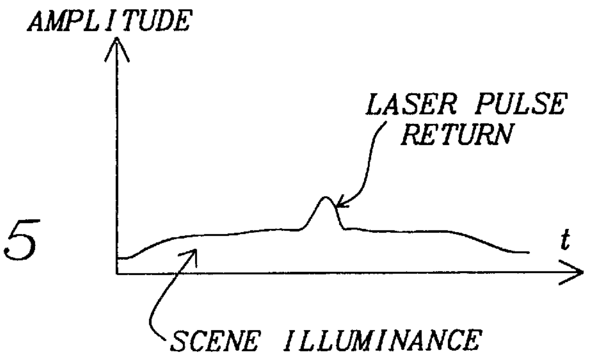
FIG. 5
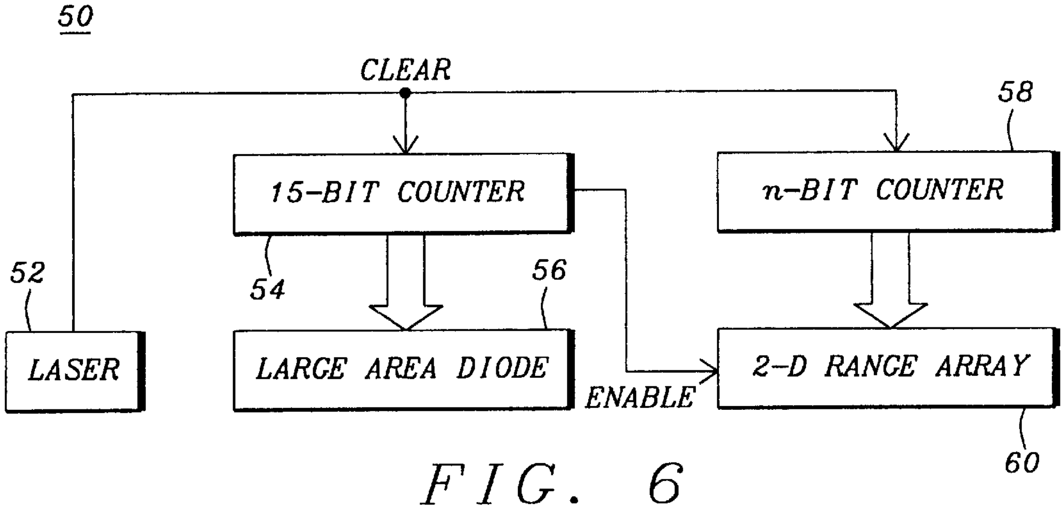
FIG. 6
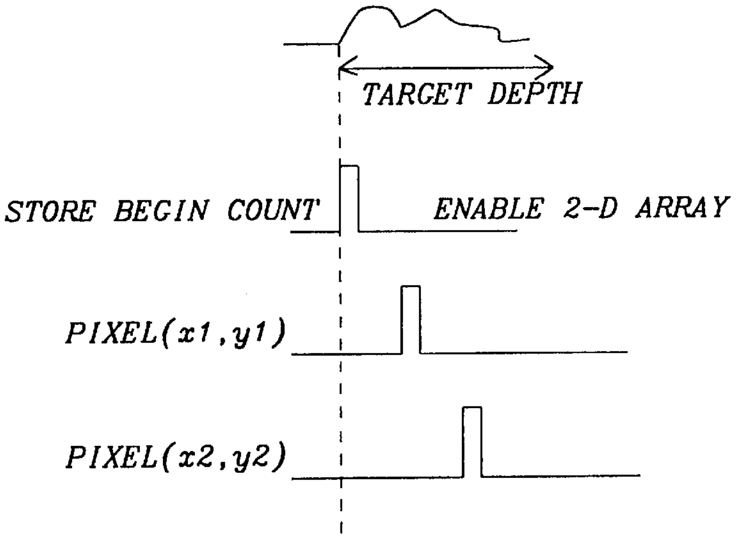
FIG. 7A
FIG. 7B
FIG. 7C
FIG. 7D

HIGH RESOLUTION 3-D IMAGING RANGE FINDER

CROSS-REFERENCE TO RELATED APPLICATIONS

This application claims the benefit of U.S. Provisional Application No. 60/224,223, filed Aug. 9, 2000, the contents of which are incorporated herein by reference.

TECHNICAL FIELD

The present invention relates, in general, to an imaging device for providing three-dimensional (3-D) image data and, more specifically, to an imaging device providing two-dimensional (2-D) image data with range data provided by laser time-of-flight (TOF) registered by individual pixels of an imaging array.

BACKGROUND OF THE INVENTION

Various techniques are known for creating a three-dimensional image of a scene, i.e., a two-dimensional image which, in addition to indicating the lateral extent of objects in the scene, further indicates the relative or absolute distance of the objects, or portions thereof, from some reference point, such as the location of the camera.

At least three basic techniques are commonly used to create such images. In one technique, a laser or similar source of radiation is used to send a pulse to a particular point in the scene. The reflected pulse is detected and the time of flight of the pulse, divided by two, is used to estimate the distance of the point. To obtain the distance of various points in the scene, the source is made to scan the scene, sending a series of pulses to successive points of the scene.

In yet another technique, a phase shift, rather than time-of-flight, is measured and used to estimate distances. Here, too, the entire scene or relevant portions thereof must be scanned one point at a time.

In a third technique, which also involves scanning, at least a single radiation source and a corresponding detector are used, with suitable optics acting on the light in a manner which depends on the distance to the object, to determine the distance to a particular point in the scene using a triangulation technique.

The major disadvantage of all three of the above-described techniques is that each requires point by point or line by line scanning to determine the distance of the various objects in the scene. Such scanning significantly increases the frame time of the system, requires expensive scanning equipment and necessitates the use of fast and powerful computational means and complex programming.

To improve upon these techniques, some have attempted to eliminate the need for scanning objects in a scene by making 2-D imaging range finders, one example of which is the LAser Detection And Ranging (LADAR) technique. Using such technique, the number of laser pulses required is reduced, as all pixels integrate the reflected light simultaneously.

U.S. Pat. No. 6,091,905, which is incorporated herein by reference, describes a method for creating an image indicating distances to objects in a scene. The method includes modulating a laser source and detecting the received modulated signal with a detector. The method is based on the idea that a near object reflects light to the detector for a longer period of time during each cycle than a far object. The difference in duration of the detected reflected light during each cycle translates to a different intensity, or gray level, on the detector.

For example, assume that a point on object B is a shorter distance away from the laser source and/or detector than a point on object A. Then, reflected light from the point on B starts arriving at the detector relatively early in the active portion of the detector cycle and continues to be received by the detector until the detector is deactivated at the end of the active portion of the detector cycle. The reflected light from the point on B continues to proceed toward the detector for a period which corresponds to the period of irradiation. However, the portion of this reflected radiation which falls beyond the deactivation or blocking of the detector is not received by the detector and does not contribute toward the intensity sensed by the corresponding pixels of the detector.

By contrast, light reflected from the point on object A starts arriving at the detector later during the active portion of the detector cycle and also continues to be received by the detector until the detector is deactivated.

The result is that reflected light from a point on object B is received for a longer period of time than reflected light from a point on object A. As such, the intensity of gray level of each pixel during each cycle is related to the amount of time in each cycle during which radiation is received by that pixel. Hence, the intensity, or gray level, can be translated to the distance, relative or absolute, of the point on the object.

Another known 2-D imaging LADAR uses a constant current source at each pixel to charge a pixel capacitor while the pixel is illuminated. By measuring the integrated charge, a range measurement is read. This circuit suffers however, from pixel capacitor nonuniformities and temperature sensitivity.

The deficiencies of conventional devices used for providing 2-D image data and range data, based on reflected light registered by pixels of an imaging array, show that a need still exists for an improved device. The present invention addresses this need.

SUMMARY OF THE INVENTION

To meet this and other needs, and in view of its purposes, the present invention provides a three-dimensional imaging range finder using a transmitted pulse reflected from a target. The range finder includes a pixel sensor for receiving light from the target and the reflected pulse. A global counter is provided for determining a time-of-flight of the transmitted pulse. A processing circuit, which is coupled to the pixel sensor and the global counter, extracts the reflected pulse received by the pixel sensor, and stores the time-of-flight value upon extracting the reflected pulse. The pixel sensor provides a luminance signal and the processing circuit extracts the reflected pulse from the luminance signal.

In one embodiment, the processing circuit includes a matched filter for providing a peak triangular return signal centered on the reflected pulse. The processing circuit also includes a comparator for providing a write command, when the peak triangular return signal exceeds a predetermined threshold setting level and a memory for storing the time-of-flight value, when the write command is provided to the memory.

In another embodiment, the present invention provides a three-dimensional (3-D) imaging range finder using a transmitted pulse reflected from targets in a field-of-view. The 3-D imaging range finder includes a plurality of pixel sensors in an imaging array, each pixel sensor receives light, including the reflected pulse, from a respective target in the field-of-view. A global counter is included for counting predetermined intervals of time starting at transmission time of the pulse. A processing circuit is also included for extracting the reflected pulse from a respective pixel sensor and storing a value of the counted predetermined intervals of time, after extracting the reflected pulse. The global counter broadcasts the predetermined intervals of time to each of the pixel sensors in the imaging array. The imaging array provides a two-dimensional image of the targets in the field-of-view and the processing circuit of each respective pixel sensor provides depth information of the respective target in the field-of-view.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIG. 3 is a block diagram of a high speed time-of-flight counter that may be used in the 3-D imaging range finder shown in FIG. 1;

FIGS. 4A–4E are graphical illustrations of timing diagrams depicting the operation of the time-of-flight counter shown in FIG. 3;

FIG. 5 is a graphical illustration of a laser pulse return superimposed on background scene illuminance which is useful in describing the operation of the processing circuits shown in FIG. 2;

FIG. 6 is a block diagram of another embodiment of a 3-D imaging range finder using a single laser pulse; and FIGS. 7A–7D are graphical illustrations of timing diagrams depicting the operation of the 3-D imaging range finder shown in FIG. 6.

DETAILED DESCRIPTION OF THE INVENTION

Figure 1:
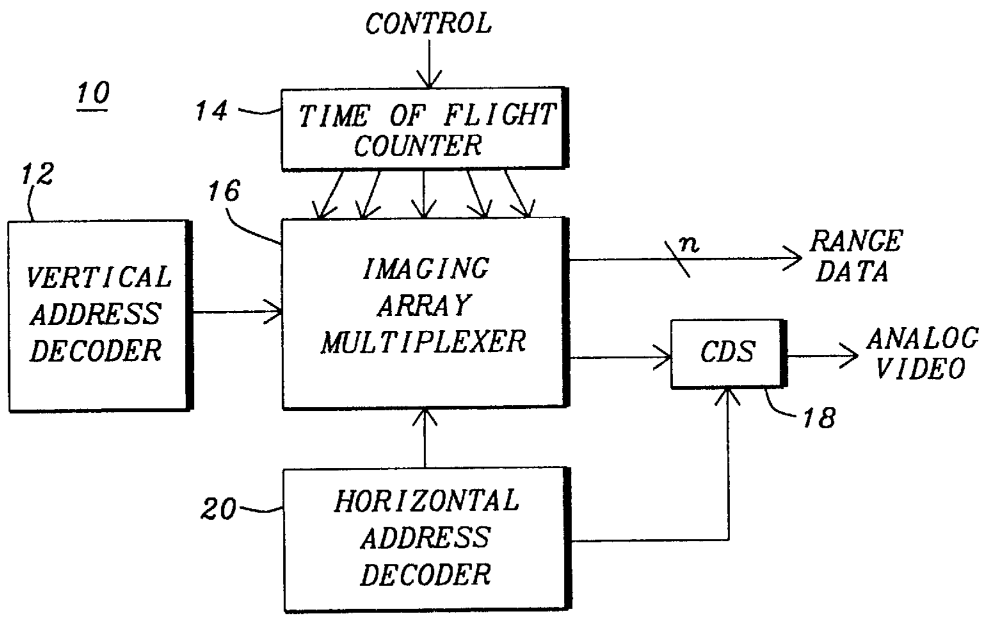
FIG. 1 is a block diagram of a 3-D imaging range finder including an imaging array with multiplexed readout of analog video and digital range data according to the invention.
Figure 2:
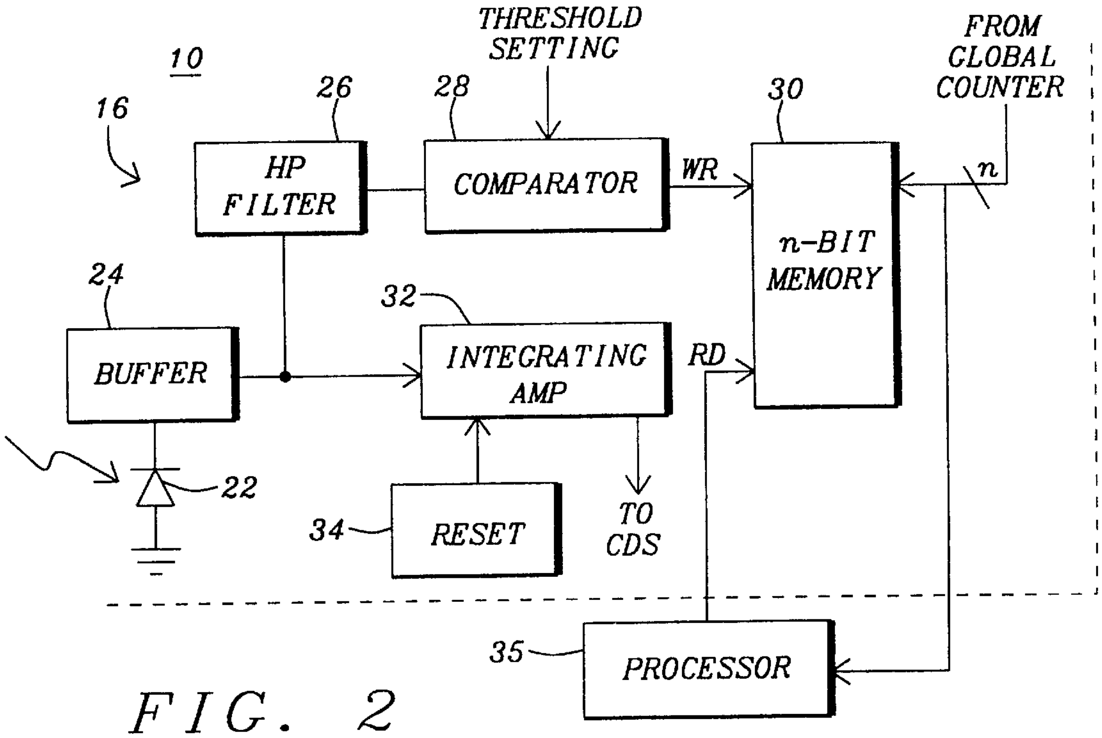
FIG. 2 is a block diagram of one pixel sensor and an associated analog and digital processing circuits that may be used in the imaging array shown in FIG. 1.

The invention can be understood by referring to FIGS. 1–3 depicting a 3-D imaging range finder, generally designated as 10. Range finder 10 includes an imaging array multiplexer 16 controlled by a vertical address decoder 12 and a horizontal address decoder 20. The output of the array multiplexer feeds a correlated double sampler (CDS) circuit 18 which produces the analog video signal. As will be explained, array multiplexer 16 provides not only the analog video signal from each pixel in the pixel array, but simultaneously provides an arrival time of the reflected laser pulse at each pixel in the array. Thus, separate output signals are provided, as shown in FIG. 1. These output signal are the analog video signal, representing the integrated scene illuminance for each pixel, and the digital range data, representing the reflected laser pulse arrival time for each pixel. By combining these two output signals, a 3-D representation of the laser-designated target may be reconstructed and displayed.

An accurate measurement of the time of the arrival of the laser pulse is provided by the time-of-flight counter 14. Counter 14 provides an elapsed time measurement that is available to each pixel in the array. By broadcasting the same elapsed time simultaneously to each pixel in the array, each pixel measures the time of arrival of the laser pulse with the same time reference. With the high speed of counter 14 temperature sensitivity is decreased as compared to conventional analog constant current source integrators.

As one skilled in the art would understand, imaging array multiplexer 16 includes a plurality of optical pixel sensors arranged in rows and columns. Each optical pixel sensor may be, for example, a charge coupled device (CCD) detector or a CMOS active pixel sensor (APS) detector. The array of detectors may be, for example, a two dimensional array of detector elements forming a 512×512 matrix. The field-of-view is imaged onto the detector elements. Each detector element provides a signal correlated to the amount of light falling on it from the field-of-view. In one example, a reset circuit resets the voltage across the detector element to some preset value. The detector element is then exposed to the illumination level of light arriving from the field-of-view. The amount of charge accumulated in the detector element is proportional to the illumination level of the light to which it is exposed.

Each row of pixel sensors is selected for output by vertical address decoder 12. Each pixel sensor in a selected row is selected for output by horizontal address decoder 20 and delivers an output signal to a corresponding output circuit that may condition the pixel sensor signals. One example of such an output circuit may include buffer 24, integrating amplifier 32 and CDS circuit 18, as shown in FIGS. 1 and 2.

By focusing an object in the field-of-view, pixel sensor 22 accumulates a charge proportional to the ambient light conditions. The detected optical signal is passed to buffer 24. With proper timing, integrating amplifier 32 receives the detected optical signal from buffer 24 and begins to integrate the signal until stopped by reset circuit 34. The integrated signal is then passed to CDS 18. It will be appreciated that CDS 18 may include an amplifier followed by a low pass filter (not shown) which reduces the noise level of the amplified signal. Additionally, the low pass filter may include a bandwidth switching control technique to optimize the response time during signal acquisition, while still restricting the noise bandwidth during the integration interval.

It will also be appreciated that a plurality of CDS circuits 18 may be used, whereby one CDS circuit receives an analog signal from each integrating amplifier 32 associated with a respective pixel sensor 22 located in a column of the matrix array. Each analog signal in the column is multiplexed to a CDS circuit for amplification and filtering.

The time-of-flight counter, generally designated as 14, is shown in detail in FIG. 3. Counter 14 includes a pre-range counter 46 and a global counter 44. The pre-range counter provides a delayed time interval to global counter 44, so that the number of clocking counts broadcast to each pixel may be reduced. By providing a trigger pulse that is activated at the end of the delayed time interval, global counter 44 begins counting from the trigger pulse until its terminal count. The trigger pulse is provided by comparator 42 which compares the count of pre-range counter 46 to a minimum expected propagation time of a laser pulse fired by a user to flood the scene being imaged. The minimum expected propagation time is stored in a minimum range register 40 and is a function of the minimum range loaded by the user. It will now be appreciated that global counter 44 only counts the propagation time of the laser pulse that is a function of the expected depth of the target.

The expected depth of the target and the user's range estimation error determines the number of bits used by global counter 44. The time-of-flight of a light pulse is approximately 3.33 ns/m. Therefore, to resolve a 30 cm depth, a 60 cm path length difference, accounting for the 2-way round trip propagation time, must be resolved. This corresponds to a 2 ns time difference. The counter frequency required for counting 2 ns time intervals is 500 MHz or greater.

Furthermore, when counting ranges from 1 km to 6 km, for example, the minimum delay time is 6.7 $\mu$s and the maximum delay time is 40 $\mu$s. For a 2 ns time interval per count, approximately $2^{14}$ counts are required. This represents the total variable range of pre-range counter 46. The bit-depth of pre-range counter 46 is 15 bits in order to resolve the time delay from the time of laser firing to the full 40 $\mu$s (12 km) laser pulse round trip propagation time.

The operation of time-of-flight counter 14 may be better understood by referring to FIGS. 4A–4E, together with FIG. 3. The user loads a minimum range value into minimum range register 40 and fires a laser pulse. A frame active interval is shown in FIG. 4A representing the time during which the range measurement is determined and broadcast to each memory (FIG. 2) associated with a respective pixel in the matrix array. The start of the frame active interval is used to clear pre-range counter 46 and global counter 44. The laser pulse is then fired shortly thereafter, as shown in FIG. 4B. The fired laser pulse starts the pre-range counter, which is designed to count up to the maximum expected propagation delay time. In the example provided, the pre-range counter counts, at 2 ns intervals per count, a 40 $\mu$s maximum expected delay time (6 km range), as shown in FIG. 4C.

The minimum range value stored by the user in minimum range register 40 is provided to comparator 42. When pre-range counter 46 reaches a count representing the minimum range value, comparator 42 activates the pulse shown in FIG. 4D, indicating that the two values are equal (A=B). The A=B pulse is provided to global counter 44 which then begins a count, as shown in FIG. 4E. Thus, global counter 44 only counts from the minimum range value to the maximum range value. This reduces the number of clock transitions broadcast to each pixel memory 30, and thus, the size of each pixel memory 30.

It will be appreciated that global counter 44 may include a Gray-code counter. The Gray-code counter may be implemented by logic or by a SRAM look-up table (LUT). The use of a Gray-code counter further reduces the number of clock edges.

By focusing the target with the ambient light condition using lens system 47, the lens setting may provide an estimate of the minimum range value to the target. The depth of field of the lens may determine the range accuracy of the estimate. Autofocus algorithms on the real time ambient light image may also provide an automatic setting for pre-range counter 46 prior to firing the laser pulse.

Once the laser pulse is fired, the pre-range counter triggers global counter 44 to provide high speed and accurate count data to the pixel memories 30, one of which is shown in FIG. 2. The laser pulse is returned to the imager together with the ambient light from the target and detected using the matrix array, one pixel of which is shown as pixel sensor 22. Although only one memory register is shown in FIG. 2, it will be appreciated that each pixel in the matrix array may have a respective memory register and associated processing circuits.

As described, the detected optical signal is passed serially to buffer 24, integrating amplifier 32 and CDS 18 to provide the 2-D image data. Buffer 24 also passes the detected optical signal to a high-pass filter 26. A representation of the detected optical signal is illustrated in FIG. 5. As shown, the detected optical signal includes an analog signal representation of the scene illuminance and a laser pulse return superimposed on the scene illuminance.

High-pass filter 26 passes high frequency components of the detected analog signal. In order to discriminate between the reflected laser pulse, the scene illuminance and optical glints, high-pass filter 26 may include characteristics of a matched filter with a cutoff frequency of 250 MHz. The matched filter provides a peak triangular return signal centered on the laser pulse return. With a cutoff frequency of 250 MHz, a laser pulse return, as narrow as 1 ns, may be detected.

The peak triangular return signal detected by high pass filter 26 is provided to comparator 28. By presetting the threshold of comparator 28 at a voltage level above the noise floor spikes, comparator 28 may provide a write command output when the reflected laser pulse exceeds the threshold setting. It will be appreciated that comparator 28 may include correlation techniques, or other discrimination techniques to insure that the detected width of the pulse matches the width of the laser pulse. Additional discrimination may reduce errors due to false ranging.

The output count from global counter 44, which is counting at a high frequency (for example, greater than or equal to 500 MHz), is latched into pixel memory 30 when comparator 28 provides the write command. It will be appreciated that pixel memory 30 may be an n-bit register located at pixel 22. One register may be provided for each pixel 22 in the matrix array. After the end of the optical survey time (for example a time greater than 40 ns from laser firing), the individual pixel register may be interrogated by a read command from processor 35 and a depth map of the scene may be generated by processor 35.

Buffer 24 and filter 26 may be located next to the pixel bump bond. A transimpedance buffer having a feedback resistor with a value set for high speed operation may be used. By using a shunt-shunt feedback configuration, the input impedance may be reduced by the open loop gain. This is similar to the Miller effect using a feedback resistor instead of a capacitor.

The transition frequency ($f_t$) of an NMOS transistor is determined by the channel length (L) of the transistor, as follows:

$$f_t = 1.5 \cdot \frac{\mu_n}{2\pi L^2}(V_{GS} - V_T)$$

The transition frequency ($f_t$) of a bipolar transistor, on the other hand, is determined by the channel width of the base (Wb), as follows:

$$f_t = 2 \cdot \frac{\mu_n}{2\pi W_B^2} V_T$$

In order to achieve an output image that appears real-time, in one embodiment, at least 30 frames are generated each second. This implies that, if each pixel sensor is to be read during each frame time, an integration period not greater than 33 ms is required. By integrating over a long period of time (for example up to 30 ms), a standard video signal may be generated. As described, the buffered signal provided by buffer 24 is sent separately to filter 26 and integrating amplifier 32. The integrating amplifier, together with CDS 18, acquires an intensity profile of the scene. The intensity profile, when integrated over the long period of time, may be used to generate an image of the ambient scene. This scene illumination may include the laser ranging light, sunlight, and any other light source (halogen headlights, fire, etc.). By integrating up to 30 ms, a standard video signal may be generated. This integrated analog signal may be reset and read out using CMOS active pixel sensor (APS) technology methods, for example. In this manner, a 2-D intensity map of the scene may be created.

In another embodiment, less than 30 frames are generated each second. By generating less than 30 frames per second (for example, 15 frames per second), the integration period may be made greater than 33 msec (for example 66 msec) and, thereby, obtaining an improved intensity profile of the scene.

In another embodiment of the invention, an automatic bias setting circuit is implemented at each pixel. This circuit may monitor a reference diode ac output signal whenever the laser is not active or awaiting a return pulse. The ac output signal may vary based on factors, such as imager fabrication variations, background shot noise, and dark current shot noise due to temperature variations. By setting the level of the bias setting circuit above the peak ac noise level, an acceptable false alarm rate may be automatically provided by the circuit. Sensitivity adjustments may be set by the user to provide an imager with an acceptable false alarm rate.

It will be appreciated that the automatic bias setting circuit may also reduce pixel-to-pixel nonuniformities. Highly sensitive avalanche photodiode detector arrays that have higher pixel nonuniformities than standard photodiodes may particularly benefit from this type of circuit.

The bias-setting circuit implemented at each pixel may be a notch filter that rejects the laser frequency and passes all other frequencies. In this manner, the laser pulse return is rejected and the bias level may be set based on the scene illuminance only.

As an alternative embodiment, the bias setting circuit may be implemented remotely from each pixel. The bias setting circuit may monitor a reference diode ac output signal, whenever the laser is not active or awaiting a return pulse. Once the threshold level of the bias setting is determined, the threshold level may be provided to comparator 28 at each pixel.

Another embodiment of the invention is shown in FIG. 6, illustrating a 2-chip detection device, generally designated as 50. As shown, a first counter 54 and a second counter 58 are included in the detection device. The first counter provides a local count to large area diode 56 and the second counter provides a global count to 2-D array matrix 60. A single laser pulse is fired from laser device 52.

Large area diode 56 may include a large single element diode circuit that detects the closest distance to the target. After firing a laser pulse from laser device 52, the same pulse may be used to clear first counter 54 and second counter 58. The closest target is first returned and seen by large area diode 56, as shown in FIG. 7A. The first counter, which may be a 15-bit counter, measures the distance to the closest target. The distance to the closest target is determined by the time interval between the firing of the laser pulse and the arrival of the reflected light from the closest target. The distance to the closest target may be stored in a register (not shown).

Upon completing the count, first counter 54 enables the 2-D range array 60, as shown in FIG. 7B. The 2-D range array receives the ambient illumination which includes the laser pulse return. Second counter 58, which has a lower bit width than the first counter, broadcasts the count to each processing circuit of each pixel in the array. The second counter counts the time interval between the closest target and a respective target depth variation seen by each pixel in the array. This technique reduces the size of the pixel memory 30.

The laser pulse return may be detected at each pixel sensor at a different target depth variation. For example, the target depth of the image seen by pixel ($x_1$, $y_1$) is less than the target depth of the image seen by pixel ($x_2$, $y_2$), as shown in FIGS. 7C and 7D. The range of each pixel with this 2-chip detection device may be obtained by adding the value of the large area diode count with the individual count value stored by each pixel from the second counter.

It will be appreciated that the processing of the illumination scene from the large area diode and the processing of the illumination scene from each pixel sensor in the matrix array may be similar to the processing described for the 3-D imaging range finder of FIG. 1.

A benefit of the 2-chip detection device shown in FIG. 6 is that operation in environments not having adequate ambient illumination may be possible. Another benefit results from the 15-bit local counter because chip complexity is reduced.

Still another benefit may be realized, when the 2-chip detection device is operated with two short laser pulses. By applying a short, considerably weaker laser pulse and reading the mean range, a signal profile describing the target depth and reflectivity may be determined. A relatively weak pulse is all that is required because of the increased area of the large area diode compared to the 2-D ranging array. A second laser pulse may be fired within nanoseconds of the first pulse. The second pulse power may be tailored to the target to compensate for reflectivity, atmospheric transmission, etc., while reducing the probability of being detected.

It will appreciated that by providing simple divider circuits to the input of the global counter clock, several depth resolutions may be supported and commanded automatically based upon the large area diode depth of target signal. Based upon the determined depth of the target from the first laser pulse, the global counter may be run at several commandable frequencies to fully determine the depth profile. With a fixed bit width to the counter, a series of depth/depth resolution results may be obtained. The depth may be set to the full range of the counter $$f_c = \frac{2^n \cdot c}{2 \cdot z}$$

by varying the counter frequency. The resulting depth resolution may be computed as $$DR = \frac{c}{2 \cdot f_c}.$$

With a nominal frequency of 500 MHz and an 8-bit global counter, a total depth of target of 76.8 meters and a depth resolution of 30 cm may be calculated. By dividing the clock frequency by 4, a depth of target of 307 meters with a depth resolution of 1.2 meters may be realized. Finer depth resolution may be gained by increasing the clock frequency, while increased depth of target may be obtained by operating with a wider global counter bus.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A range finder using a transmitted pulse reflected from a target comprising:

a pixel sensor for receiving light from the target, including the reflected pulse, the pixel sensor being implemented within a pixel;

a global counter implemented outside of the pixel for generating a time-of-flight value of the transmitted pulse; and a processing circuit including a pixel memory implemented within the pixel and coupled to the pixel sensor and the global counter for (a) extracting the reflected pulse received by the pixel sensor and (b) storing the time-of-flight value provided by the global counter in the pixel memory, responsive to the extracted reflected pulse.

2. The range finder of claim 1, wherein the pixel sensor provides a luminance signal and the processing circuit includes a high pass filter to extract the reflected pulse from the luminance signal.

3. The range finder of claim 2, wherein the processing circuit includes a matched filter for providing a peak triangular return signal centered on the reflected pulse.

4. The range finder of claim 3, wherein the processing circuit includes a comparator for providing a write command, when the peak triangular return signal exceeds a predetermined threshold setting level; and a memory for storing the time-of-flight value, when the write command is provided to the memory.

5. The range finder of claim 1, wherein the pixel sensor is one of a plurality of pixel sensors arranged in a matrix array.

6. The range finder of claim 1, wherein the global counter includes a first counter for counting the time-of-flight of the transmitted pulse to reach a predetermined minimum range, and a second counter for counting the time-of-flight of the transmitted pulse from the predetermined minimum range to a predetermined maximum range; and the time-of-flight value is based on a range between the predetermined minimum range and the predetermined maximum range.

7. The range finder of claim 6, further including a lens system having a focus control wherein the predetermined minimum range is set by monitoring the focus control of the lens system.

8. The range finder of claim 4, wherein the predetermined threshold setting level is based on at least ambient light conditions of the target and power level of the transmitted pulse.

9. The range finder of claim 1, wherein the target is in a field-of-view of the pixel sensor, and the range finder further includes a large area diode coupled to a local counter, wherein the local counter counts time-of-flight of the transmitted pulse to an other target in the field-of-view, and the other target is closer in range to the large area diode than the range between the pixel sensor and the target, and the range between the pixel sensor and the target is determined by adding the time-of-flight counted by the local counter and the time-of-flight counted by the global counter.

10. The range finder of claim 1, wherein the processing circuit provides the stored time-of-flight value to a processor for calculating a range between the pixel sensor and the target.

11. The range finder of claim 6, wherein the processing circuit includes a memory for storing the time-of-flight value, the memory having a bit-size based on the range between the predetermined minimum range and the predetermined maximum range.

12. The range finder of claim 11, wherein the second counter is an N-bit counter, and the memory included in the processing circuit is an N-bit memory.

13. The range finder of claim 6, wherein the processing circuit includes a memory for storing the time-of-flight value, the first counter having a first bit-size and the second counter having a second bit-size, the first bit-size being larger than the second bit-size, and the memory having a bit-size that is equal to the second bit-size.

14. A three-dimensional (3-D) imaging range finder using a transmitted pulse reflected from targets in a field-of-view comprising:

a plurality of pixel sensors in an imaging array, each pixel sensor being implemented within a respective pixel of the imaging array and receiving light, including the reflected pulse, from a respective target in the field-of-view, a global counter separate from the pixel array for counting predetermined intervals of time starting at transmission time of the pulse to produce a count value; and a plurality of processing circuits implemented within the respective plurality of pixels for extracting the reflected pulse from a respective pixel sensor and storing the count value provided by the global counter, after extracting the reflected pulse.

15. The 3-D imaging range finder of claim 14, wherein the global counter broadcasts the count of the predetermined intervals of time to each of the pixels in the imaging array.

16. The 3-D imaging range finder of claim 15, wherein a separate processing circuit is coupled between the global counter and each of the pixel sensors in the imaging array.

17. The 3-D imaging range finder of claim 14, wherein the processing circuit includes a memory for storing the value of the counted predetermined intervals of time, and output data lines for transmitting the value to a processor for calculating a range between the respective pixel sensor and the respective target.

18. The 3-D imaging range finder of claim 14, wherein the imaging array provides a two-dimensional image of the targets in the field-of-view and the processing circuit of each respective pixel sensor provides depth information of the respective target in the field-of-view.

19. In an imaging pixel array viewing objects in a field-of-view, a method of determining range to an object comprising the steps of:

(a) transmitting a pulse to the object;

(b) receiving ambient light from the object at a pixel of the pixel array;

(c) receiving a reflection of the pulse from the object at the pixel after transmitting the pulse in step (a);

(d) starting a time counter after transmitting the pulse in step (a);

(e) separating the pulse from the ambient light, in the pixel, after steps (b) and (c);

(f) receiving a count value from the started time counter of step (d); and (g) storing the received count value in the pixel, on separating the pulse in step (e), as a measure of the range to the object.

20. The method of claim 19, wherein steps (c), (e) and (f) are performed by a respective pixel sensor of the imaging array viewing a respective object in the field of view.

21. The method of claim 20, wherein the respective pixel sensor determines the time interval of step (f) separately from any other respective pixel sensor in the imaging array.

22. The method of claim 19, further including the steps of:

(g) focusing the imaging array on an object in the field-of-view;

(h) determining a minimum time interval for the transmitted pulse to travel to and from the object; and starting the time counter in step (d) after the minimum time interval determined in step (h).

23. The method of claim 19, wherein the receiving steps of (b) and (c) are performed by the same pixel sensor in the imaging array.

* * * * *